United States Patent
Sittig (10) Patent No.: US 10,328,759 B1
(45) Date of Patent: Jun. 25, 2019

(54) SNOWMOBILE FLOATER ATTACHMENT ASSEMBLY

(71) Applicant: Paul Sittig, Valley Springs, SD (US)

(72) Inventor: Paul Sittig, Valley Springs, SD (US)

( * ) Notice: Subject to any disclaimer, the term of this patent is extended or adjusted under 35 U.S.C. 154(b) by 0 days.

(21) Appl. No.: 15/854,965

(22) Filed: Dec. 27, 2017

(51) Int. Cl.
*B60F 3/00* (2006.01)

(52) U.S. Cl.
CPC .......... *B60F 3/0076* (2013.01); *B60F 3/0038* (2013.01)

(58) Field of Classification Search
CPC .............................. B60F 3/0076; B60F 3/0038
See application file for complete search history.

(56) References Cited

U.S. PATENT DOCUMENTS

| | | | |
|---|---|---|---|
| 3,646,904 A | 3/1972 | Lanning et al. | |
| 4,893,692 A * | 1/1990 | Smith | B62M 27/02 180/190 |
| 5,150,662 A | 9/1992 | Boyd et al. | |
| 5,682,832 A | 11/1997 | Millard | |
| 6,062,156 A | 5/2000 | Radke et al. | |
| D596,530 S | 7/2009 | Petit et al. | |
| 8,678,868 B2 | 3/2014 | Bailey et al. | |
| 8,777,680 B2 | 7/2014 | MacDonald | |
| 9,216,623 B1 | 12/2015 | Pistov | |
| 2017/0217271 A1* | 8/2017 | Portsmouth | B60F 3/0061 |

* cited by examiner

*Primary Examiner* — Anthony D Wiest (57) ABSTRACT

A snowmobile floater attachment assembly for adapting a snowmobile into a land vehicle and watercraft includes a snowmobile that has a top side and a bottom side. The snowmobile includes a left ski, a right ski and a track that extends outwardly from the bottom side. A primary floater is removably attachable to the snowmobile and provides buoyancy to a rear side of the snowmobile. A plurality of back couplers is included. Each of the back couplers removably attaches the primary floater to the snowmobile. A first ski floater and a second ski floater are included. The first ski floater is positioned on the left ski and the second ski floater is positioned on the right ski to provide buoyancy to a forward side of the snowmobile. The snowmobile floats in water when each of the primary, first ski and second ski floaters is attached to the snowmobile.

7 Claims, 7 Drawing Sheets

SNOWMOBILE FLOATER ATTACHMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to amphibious adaptor for a snowmobiles and more particularly pertains to a new amiphibious adaptor for a snowmobile for adapting a snowmobile into a land vehicle and watercraft.

BRIEF SUMMARY OF THE INVENTION

An embodiment of the disclosure meets the needs presented above by generally comprising a snowmobile that has a top side and a bottom side. The snowmobile includes a left ski, a right ski and a track that extends outwardly from the bottom side. A primary floater is removably attachable to the snowmobile. The primary floater provides buoyancy to a rear side of the snowmobile. A plurality of back couplers is included wherein each of the back couplers removably attaches the primary floater to the snowmobile. A first ski floater and a second ski floater are included. The first ski floater is positioned on the left ski and the second ski floater is positioned on the right ski. The first ski floater and the second ski floater provide buoyancy to a forward side of the snowmobile. The snowmobile is buoyant and floats in water when each of the primary floater. The first ski floater and the second ski floater is attached to the snowmobile.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
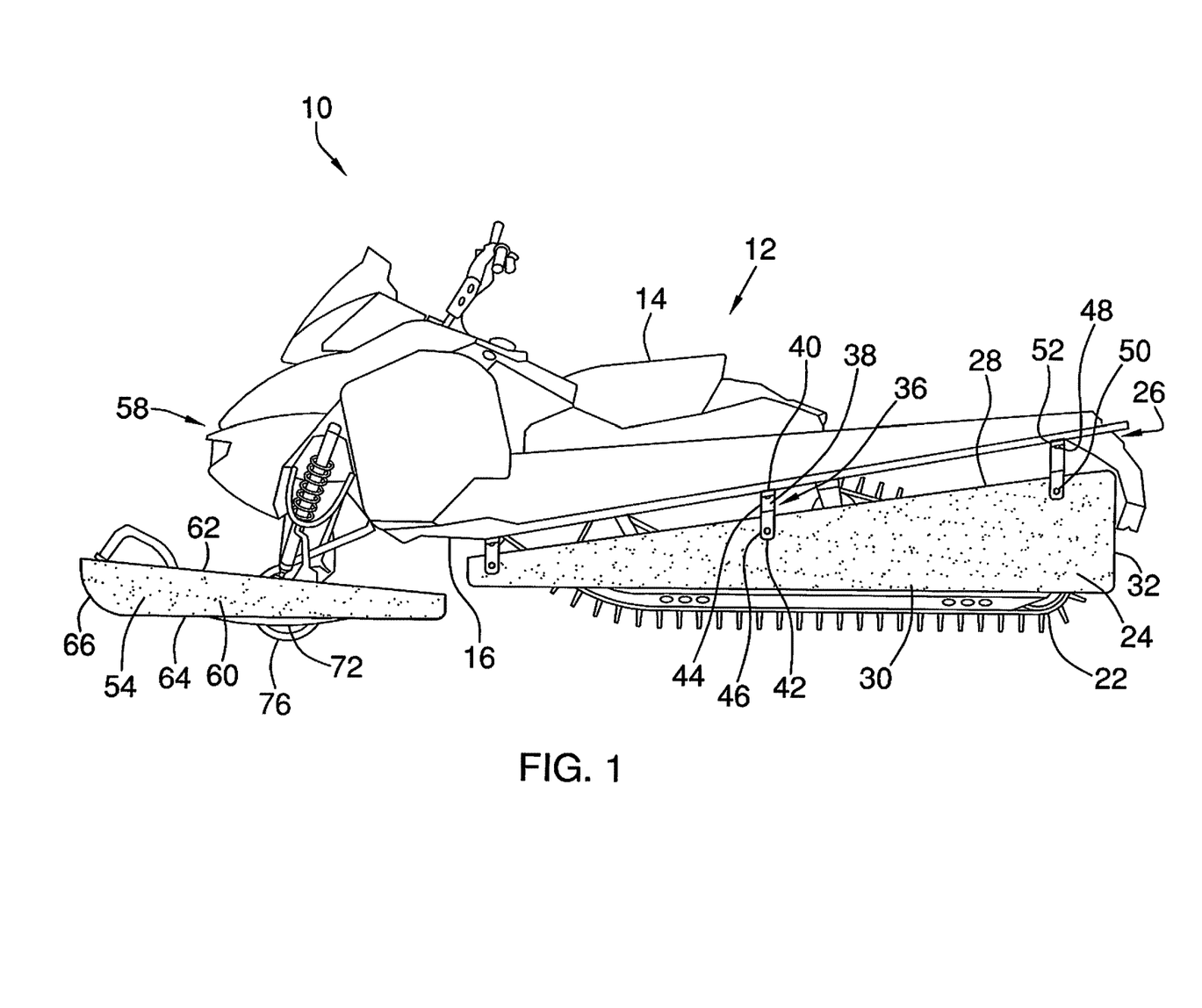
FIG. 1 is a side view of a snowmobile floater attachment assembly according to an embodiment of the disclosure.
Figure 2:
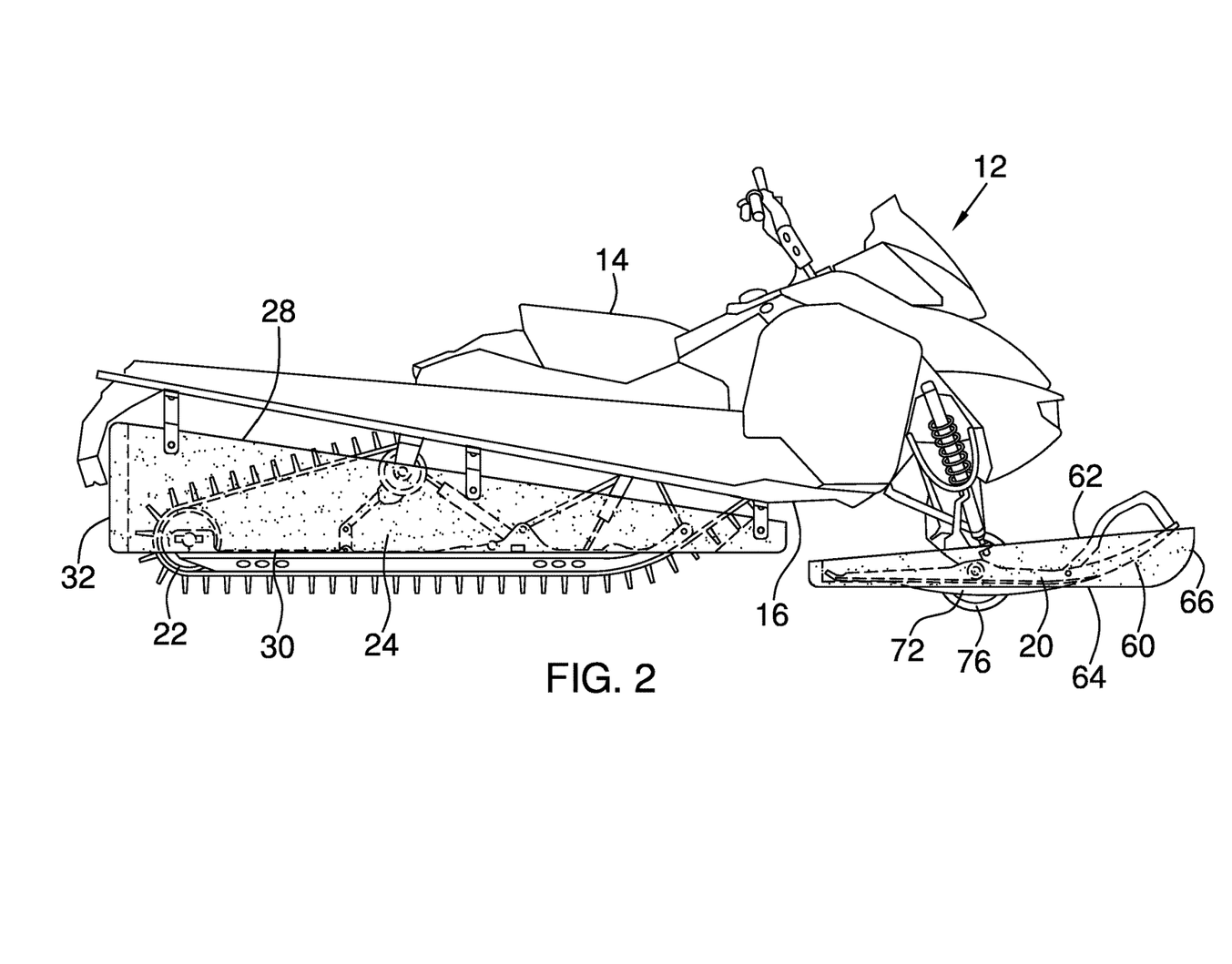
FIG. 2 is a side view of an embodiment of the disclosure.
Figure 3:
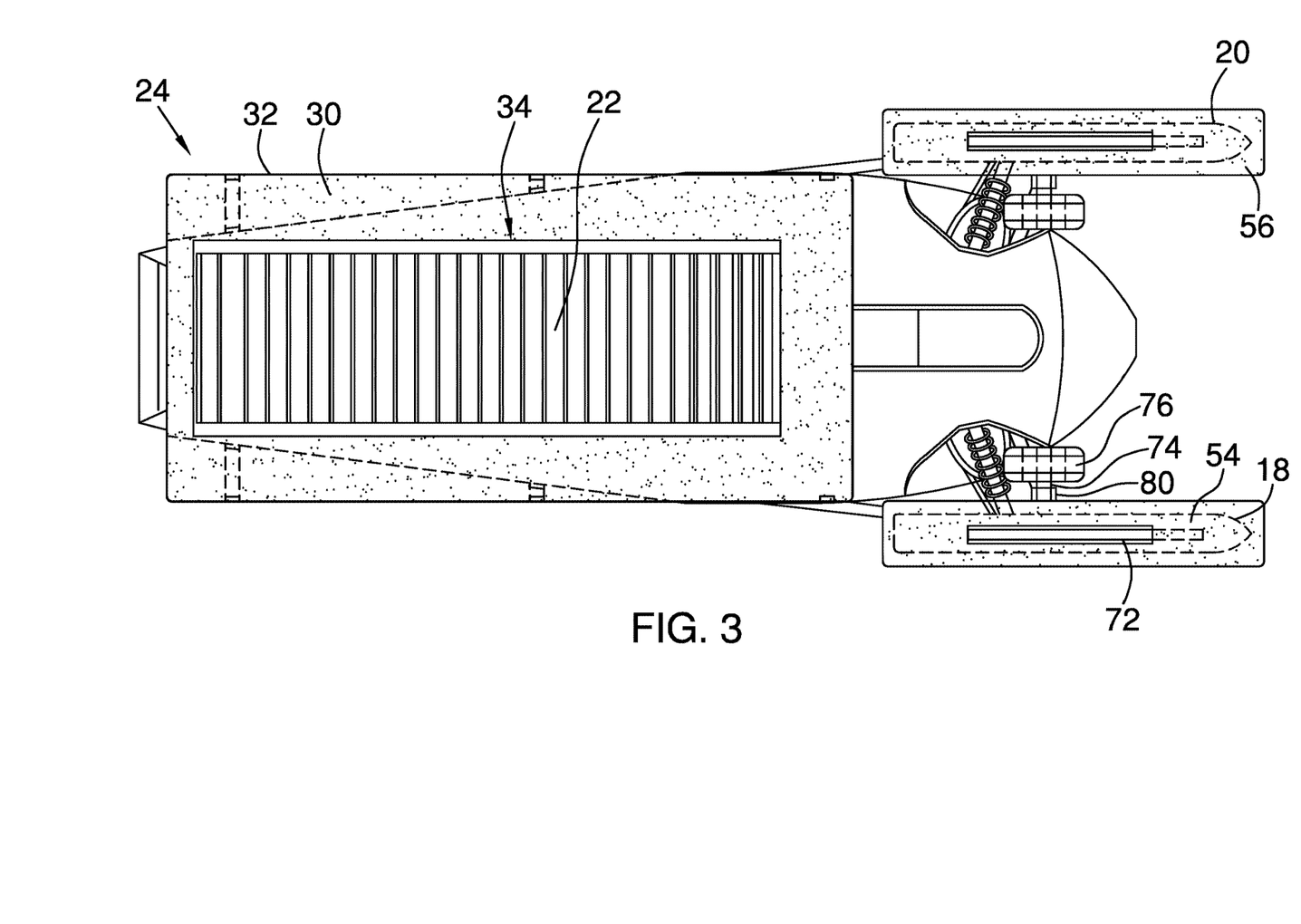
FIG. 3 is a bottom view of an embodiment of the disclosure.
Figure 4:
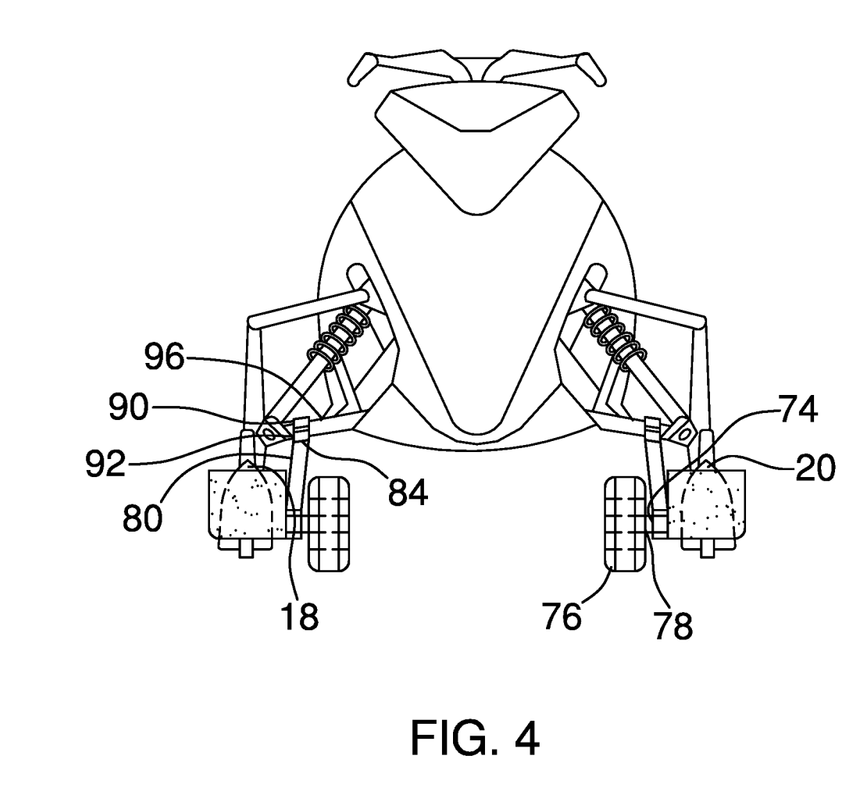
FIG. 4 is a front view of an embodiment of the disclosure.
Figure 5:
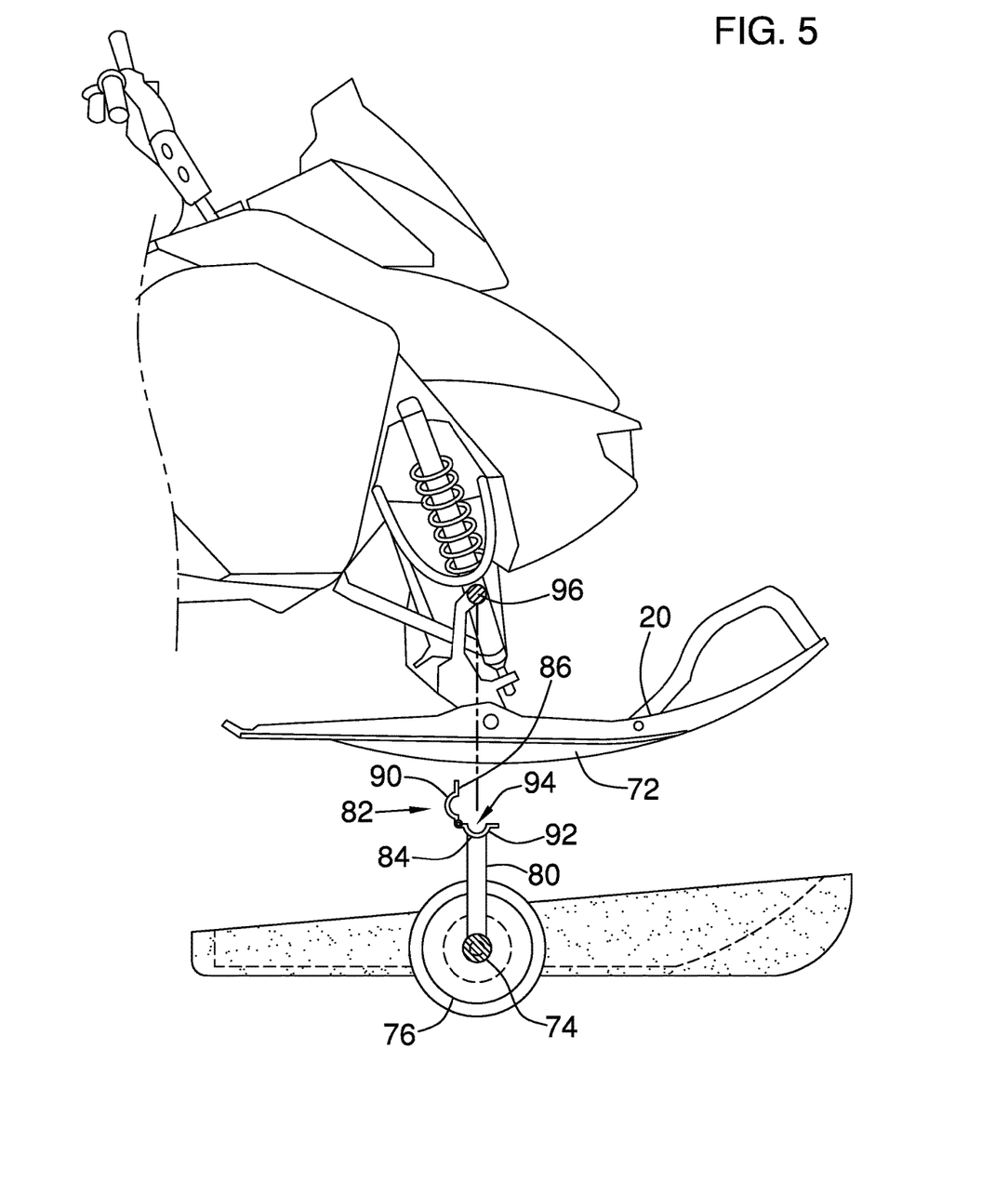
FIG. 5 is a side view of an embodiment of the disclosure.
Figure 6:
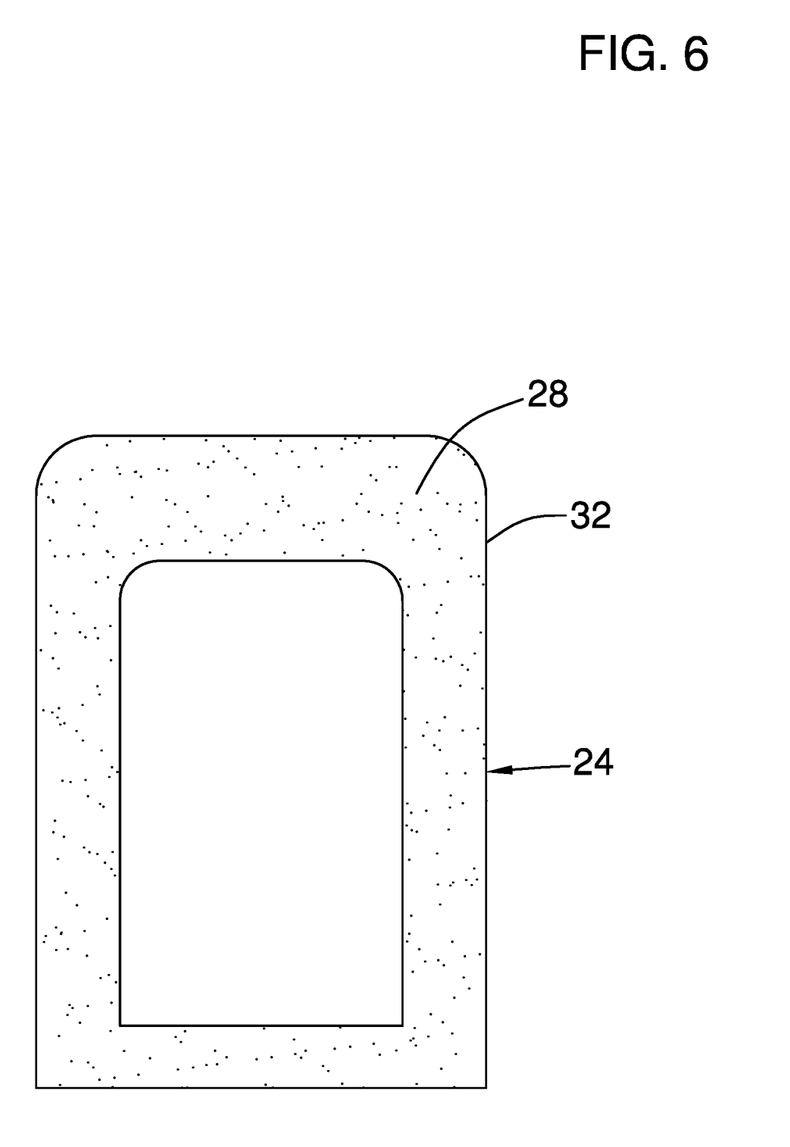
FIG. 6 is a top view of an embodiment of the disclosure.
Figure 7:
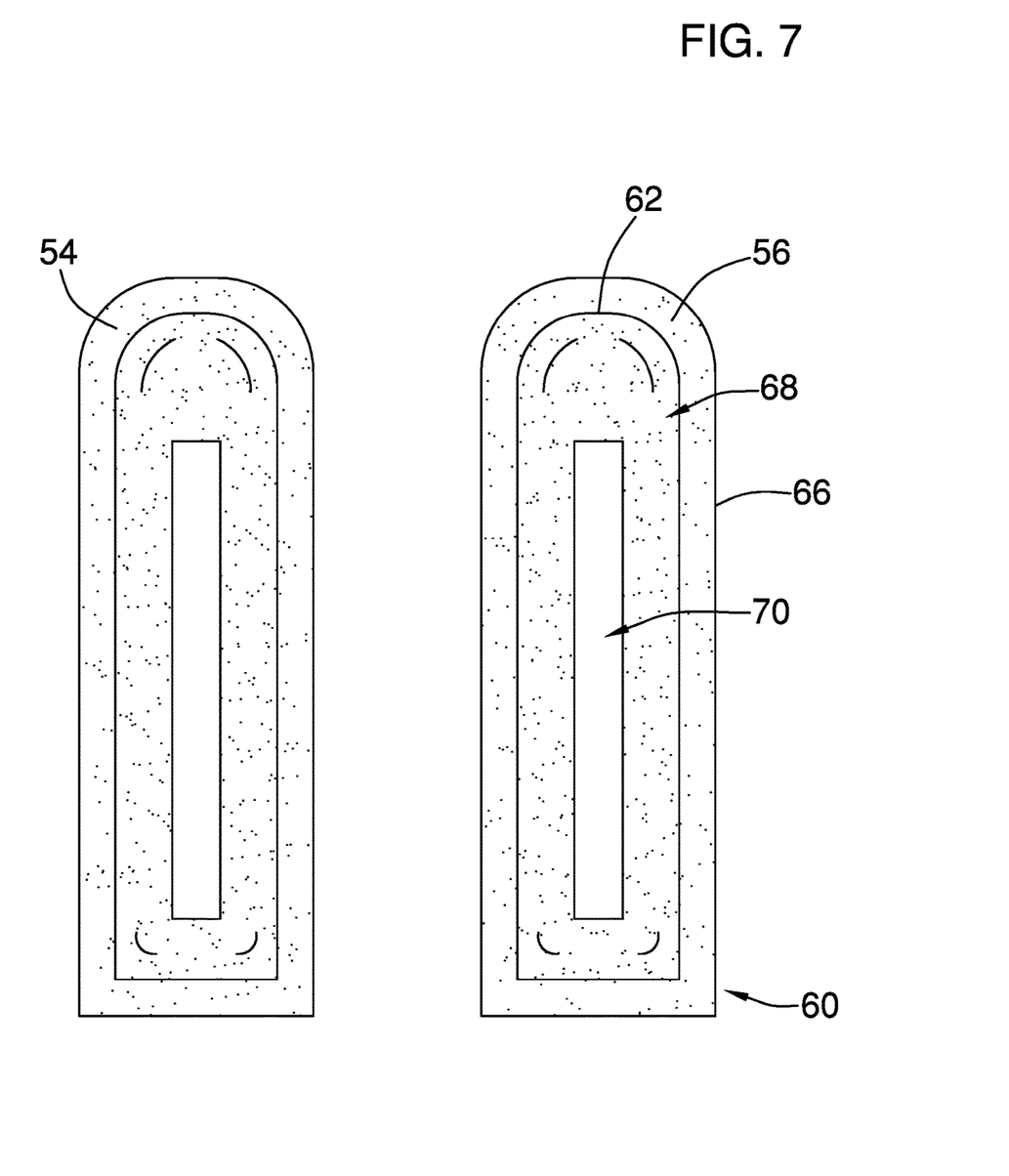
FIG. 7 is a top view of an embodiment of the disclosure.

With reference now to the drawings, and in particular to FIGS. 1 through 7 thereof, a new amphibious adaptor for a snowmobile embodying the principles and concepts of an embodiment of the disclosure and generally designated by the reference numeral 10 will be described.

As best illustrated in FIGS. 1 through 7, the snowmobile floater attachment assembly 10 generally comprises a snowmobile 12 that has a top side 14 and a bottom side 16. The snowmobile 12 includes a left ski 18, a right ski 20 and a track 22 that extends outwardly from the bottom side 16. A primary floater 24 is removably attachable to the snowmobile 12. The primary floater 24 provides buoyancy to a rear side 26 of the snowmobile 12. The primary floater 24 has a top wall 28, a bottom wall 30 and a perimeter wall 32 that extends between and is attached to the top wall 28 and the bottom wall 30. The primary floater 24 has an opening 34 that extends through the top wall 28 and bottom wall 30. The opening 34 is aligned with the track 22 of the snowmobile 12 such that the track 22 extends through the opening 34 and below the bottom wall 30. The track 22 can be rotated to move the snowmobile 12 forward over water. The primary floater 24 comprises a water buoyant material.

A plurality of back couplers 36 is included wherein each of the back couplers 36 removably attaches the primary floater 24 to the snowmobile 12. Each of the back couplers 36 is removably attached to the perimeter wall 32 of the primary floater 24 and extends upwardly therefrom. Each of the back couplers 36 is removably attached to the bottom side 16 of the snowmobile 12.

The back couplers 36 may comprise of a plate 38 that has a top end 40 and a bottom end 42. An upper portion 44 of the plate 38 extends downwardly from the top end 40 and a lower portion 46 of the plate 38 extends upwardly from the bottom end 42. A first fastener 48 is removably extended through the upper portion 44 and into the bottom side 16 of the snowmobile 12 to secure the plate 38 to the snowmobile 12. A second fastener 50 is removably extended through the lower portion 46 and into the perimeter wall 32 of the primary floater 24 to couple the snowmobile 12 to the primary floater 24. The plate 38 may have a bend 52 between the upper portion 44 and the lower portion 46 to accommodate the positioned of the upper portion 44 relative to the snowmobile 12. The first and second fasteners 48, 50 may comprise of screws, bolts or other fasteners suitable to secure the plate 38 to the snowmobile 12 and the primary floater 24.

A first ski floater 54 and a second ski floater 56 are also included. The first ski floater 54 is positioned on the left ski 18 and the second ski floater 58 is positioned on the right ski 20. The first ski floater 54 and the second ski floater 56 provide buoyancy to a forward side 58 of the snowmobile 12. The snowmobile 12 is buoyant and floats in water when each of the primary floater 24, the first ski floater 54 and the second ski floater 56 is attached to the snowmobile 12.

Both the first ski floater 54 and the second ski floater 56 comprise a buoy 60 that has an upper wall 62, a lower wall 64 and a peripheral wall 66 that is attached to and extends between the upper wall 62 and the lower wall 64. The buoy 60 has a receiving space 68 that extends into the upper wall 62 toward the lower wall 64. A corresponding one of the skis 18, 20 of the snowmobile 12 is positioned in the receiving space 68. The receiving space 68 includes a slit 70 that extends through the upper wall 62 to the lower wall 64 such that a runner 72 of the corresponding ski 18, 20 is positionable through the slit 70 and extends downwardly through the buoy 60. The buoy 60 comprises a buoyant material.

A rod 74 extends outwardly from the peripheral wall 66 such that the rod 74 extends inwardly toward the snowmobile 12 perpendicular to the peripheral wall 66. A wheel 76 is rotatably coupled to a distal end 78 of the rod 74 relative to the peripheral wall 66. The wheel 76 extends below the buoy 60 wherein the forward side 58 of the snowmobile 12 rolls when on a ground surface. A support member 80 is attached to and extends upwardly from the rod 74. A forward coupler 82 is attached to a distal end 84 of the support member 80 relative to the rod 74 wherein the forward coupler 82 releasably engages the bottom side 16 of the snowmobile 12.

The forward coupler 82 may comprise a tube 86. The tube 86 has a break 88 that extends through the tube 86 and defines a top portion 90 and a bottom portion 92. The bottom portion 92 is attached to the distal end 84 of the support member 80. The top portion 90 is hingedly coupled to the bottom portion 92 such that the top portion 90 can be pivoted to expose an interior 94 of the tube 86. A support shaft 96 of the snowmobile 12 is positionable in the tube 86 when the tube 86 is opened and secured to the associated ski floater 54, 56 when the tube 86 is closed.

In use, the primary floater 24 is attached to the bottom side 16 of the snowmobile 12 with each of the back couplers 36. The track 22 is positioned through the opening 34 of the primary floater 24. Each of the ski floaters 54, 56 is positioned on the associated ski 18, 20. The runner 72 of the ski 18, 20 is positioned through the slit 70 and the support shaft 96 of the snowmobile 12 is placed into the interior 94 of the tube 86 and the tube 86 is closed to secure the ski floater 54, 56 to the snowmobile 12. The snowmobile 12 is buoyant and floats in water when each of the primary floater 24, the first ski floater 54 and the second ski floater 56 is attached to the snowmobile 12. The snowmobile 12 is turned on and the track 22 moves the snowmobile 12 forward while each of the ski floaters 54, 56 are rotated by the associated skis 18, 20 to turn the snowmobile 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A snowmobile land to water adaptor system configured to be attached to a snowmobile and provide buoyancy thereto, said system comprising:
    a snowmobile having a top side and a bottom side, said snowmobile including a left ski, a right ski and a track extending outwardly from said bottom side;
    a primary floater being removably attachable to said snowmobile, said primary floater providing buoyancy to a rear side of said snowmobile;
    a plurality of back couplers, each of said back couplers removably attaching said primary floater to said snowmobile;
    a first ski floater and a second ski floater, said first ski floater being positioned on said left ski and said second ski floater being positioned on said right ski, said first ski floater and said second ski floater providing buoyancy to a forward side of said snowmobile, said snowmobile being buoyant and floating in water when each of said primary floater, said first ski floater and said second ski floater is attached to said snowmobile; and
    wherein said primary floater has a top wall, a bottom wall and a perimeter wall extending between and being attached to said top wall and said bottom wall, said primary floater having an opening extending through said top wall and bottom walls, said opening being aligned with said track of said snowmobile such that said track extends through said opening, said track extending below said bottom wall, said primary floater comprises a water buoyant material.

2. The snowmobile land to water adaptor system according to claim 1, wherein each of said back couplers is removably attached to said perimeter wall of said primary floater and extending upwardly therefrom, each of said back couplers being removably attached to a bottom side of said snowmobile.

3. The snowmobile land to water adaptor system according to claim 1, wherein both said first ski floater and said second ski floater comprises a buoy having a upper wall, a lower wall and a peripheral wall being attached to and extending between said upper wall and said lower wall, said buoy having a receiving space extending into said upper wall toward said lower wall, a corresponding one of said skis of said snowmobile being positioned in said receiving space, said buoy comprising a buoyant material.

4. The snowmobile land to water adaptor system according to claim 3, wherein said receiving space includes a slit extending through said upper wall to said lower wall such that a runner of said corresponding ski is positionable through said slit and extending downwardly through said buoy.

5. The snowmobile land to water adaptor system according to claim 4, wherein said first ski floater and said second ski floater further include:
- a rod extending outwardly from said peripheral wall, said rod extending inwardly toward said snowmobile perpendicular to said peripheral wall;
- a support member being attached to and extending upwardly from said rod; and
- a forward coupler being attached to a distal end of said support member relative to said rod, said forward coupler releasably engaging said bottom side of said snowmobile.

6. The snowmobile land to water adaptor system according to claim 5, a wheel being rotatably coupled to a distal end of said rod relative to said peripheral wall, said wheel extending below said buoy wherein said forward side of said snowmobile rolls when on a ground surface.

7. A snowmobile land to water adaptor system configured to be attached to a snowmobile and provide buoyancy thereto, said system comprising:
- a snowmobile having a top side and a bottom side, said snowmobile including a left ski, a right ski and a track extending outwardly from said bottom side;
- a primary floater being removably attachable to said snowmobile, said primary floater providing buoyancy to a rear side of said snowmobile, said primary floater having a top wall, a bottom wall and a perimeter wall extending between and being attached to said top wall and said bottom wall, said primary floater having an opening extending through said top wall and bottom walls, said opening being aligned with said track of said snowmobile such that said track extends through said opening, said track extending below said bottom wall, said primary floater comprising a water buoyant material;
- a plurality of back couplers, each of said back couplers removably attaching said primary floater to said snowmobile, each of said back couplers being removably attached to said perimeter wall of said primary floater and extending upwardly therefrom, each of said back couplers being removably attached to a bottom side of said snowmobile;
- a first ski floater and a second ski floater, said first ski floater being positioned on said left ski and said second ski floater being positioned on said right ski, said first ski floater and said second ski floater providing buoyancy to a forward side of said snowmobile, said snowmobile being buoyant and floating in water when each of said primary floater, said first ski floater and said second ski floater is attached to said snowmobile, both said first ski floater and said second ski floater comprising:
  - a buoy having a upper wall, a lower wall and a peripheral wall being attached to and extending between said upper wall and said lower wall, said buoy having a receiving space extending into said upper wall toward said lower wall, a corresponding one of said skis of said snowmobile being positioned in said receiving space, said receiving space including a slit extending through said upper wall to said lower wall such that a runner of said corresponding ski is positionable through said slit and extending downwardly through said buoy, said buoy comprising a buoyant material;
  - a rod extending outwardly from said peripheral wall, said rod extending inwardly toward said snowmobile perpendicular to said peripheral wall;
  - a wheel being rotatably coupled to a distal end of said rod relative to said peripheral wall, said wheel extending below said buoy wherein said forward side of said snowmobile rolls when on a ground surface;
  - a support member being attached to and extending upwardly from said rod; and
  - a forward coupler being attached to a distal end of said support member relative to said rod, said forward coupler releasably engaging said bottom side of said snowmobile.

\* \* \* \* \*